July 15, 1924.
R. G. NOBLE
AUTOMOBILE ENGINE BRAKE
Filed Jan. 21, 1924
1,501,363
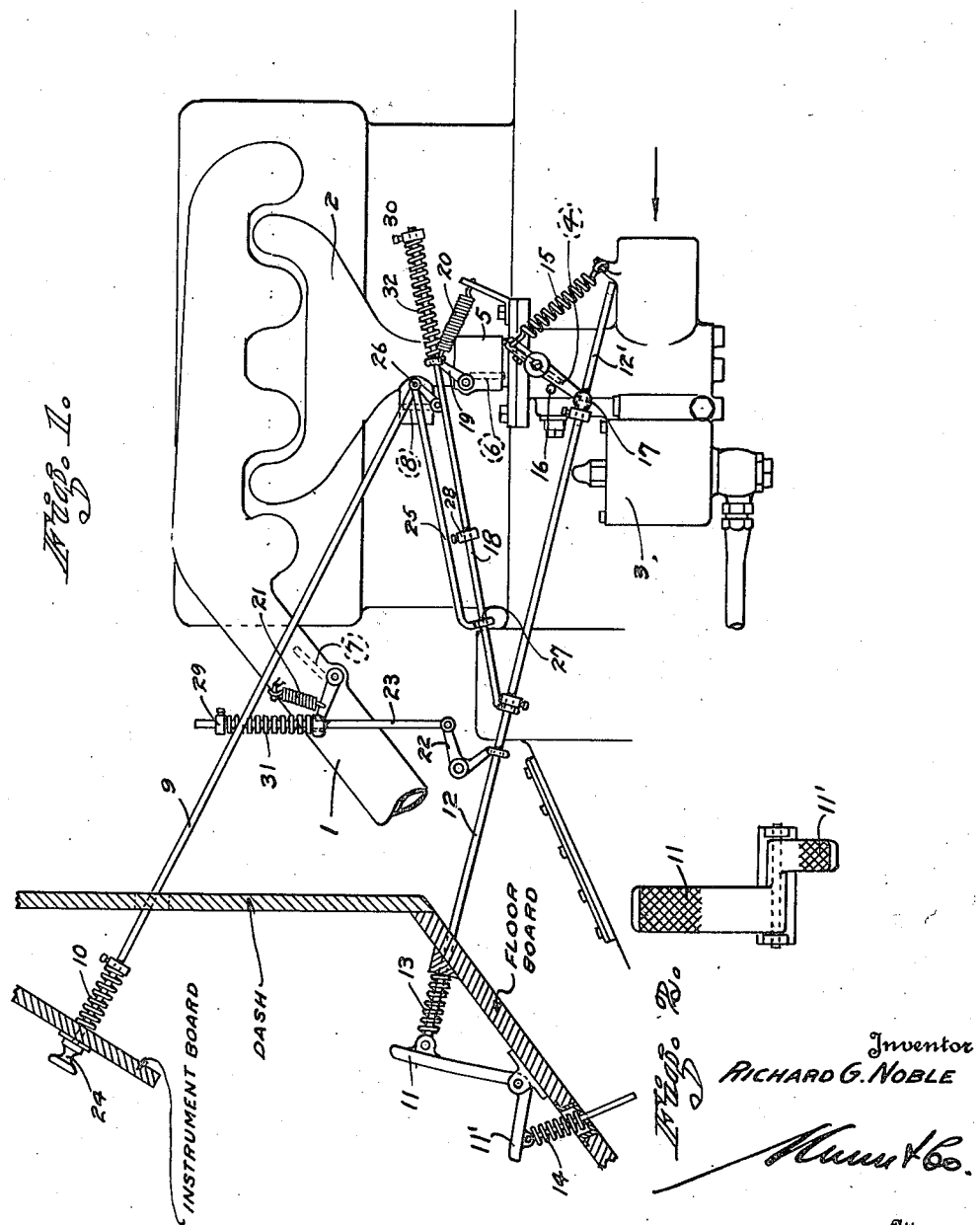
Inventor
RICHARD G. NOBLE
Attorneys Patented July 15, 1924.

1,501,363

UNITED STATES PATENT OFFICE.

RICHARD G. NOBLE, OF RIVERSIDE, CALIFORNIA.

AUTOMOBILE ENGINE BRAKE.

Application filed January 21, 1924. Serial No. 687,620.

*To all whom it may concern:*

Be it known that I, RICHARD G. NOBLE, a citizen of the United States, and a resident of Riverside, county of Riverside, State of California, have invented a new and useful Automobile Engine Brake, of which the following is a specification.

This invention relates to means for braking an automobile through control of its engine gases, either on the intake or exhaust stroke, or both.

The objects of my invention are to augment and control the braking action obtained in an ordinary automobile when using the engine in compression in coasting down hills, by providing increased compression of the gases on one stroke of the pistons, or increased vacuum on one stroke, or both the above, or increased compression through admission of pure air to the cylinders instead of the lighter mixture of air and gasoline vapor.

I attain the objects outlined by the arrangement shown in the accompanying drawings and in which:

Figure 1 is a diagrammatic view of the cooperating parts of an automobile arranged to carry out my invention, the view being a fragmentary elevation partly in section showing engine members, carburetor, foot board, and control. Figure 2 is an end view of the foot treadle or accelerator.

In contemplating the representation shown in Figure 1 it should be observed that the parts are arranged to show all the essential features in this one view and that in various automobiles, the installation would assume different forms, with various arrangements of levers, bell cranks, etc. in order to transmit the proper motion to the different valves, yet overcome any physical barriers which the particular automobile might present.

In the drawings (1) represents the common exhaust pipe from a multi-cylinder gas engine, (2) the intake manifold, (3) the carburetor, (4) the regular throttle valve in the carburetor, (5) a section placed in the intake having an auxiliary throttle valve (6) adapted to close tightly to completely seal off the carburetor. (7) is a similar valve in the exhaust pipe, and (8) is a valve for admitting air to the intake at a point between the engine and the valve (6).

The air valve (8) is hand or foot controlled through means of a rod (9) and is normally kept tightly closed by the spring (10).

The regular throttle valve (4) is opened by a foot lever (11) connected to a rod (12) and is normally closed to idling speed by the spring (13) which is of limited operating length to force the lever (11) to the position shown.

The lever (11) has an offset portion (11') bearing against a similar limited spring (14) and upon which offset the operator's toe may be placed to press downward and thereby pull the rod (12) further back than the normal position shown with throttle at idling position.

This further movement does not affect the throttle as the throttle itself is spring actuated at (15) to close and is limited in its closing movement by a stop pin (16), the rod (12) functions merely in allowing it to close when pressure on foot lever (11) is released, and the rod (12) has an extension (12'), (or slip joint) passing freely through the throttle arm (17) to permit the further backward movement of the rod.

Suitably connected for simultaneous action with rod (12) is a rod (18) also slip-jointed to the arm (19) of the valve (6) whereby this auxiliary throttle is tightly closed upon further rearward movement of the rod (12) after the regular throttle is closed to idling position.

The valve (6) is normally held open by its spring (20). The exhaust closing valve (7) is likewise hooked up to rod (12) for closing after the valve (6) is closed and is also normally held open by a spring (21). A bell crank (22) and a rod (23) indicates one form of this hook up.

Upon releasing all pressure from either portion of the foot lever it assumes the position shown in the drawing with valves (6) and (7) open and throttle valve (4) at idling position, and upon pressing against the portion (11) of the foot lever the throttle is opened for speeding up the engine without affecting the valves (6) and (7).

In using my brake the ignition is first turned off and a pressure on foot lever (11') closes valve (6) thereby greatly increasing the suction pull of the pistons, then closes valve (7) to build up the compression by preventing any compressed gases from escaping, this all being accomplished from a single foot controlled device.

If it is desired to further increase the compression pure air may be admitted to the engine through the valve (8) operated by the separate hand control (24).

The functioning of the air valve (8) may be made automatic and the valve opened for admission of air after the other valves are all closed, by actuating it from the main rod (12) by an extra rod (25). To secure the proper motion the rod (25) is pivoted to the valve arm at (26) and slip jointed over the rod (18) at (27) and actuated by the collar (28) on rod (18).

The rods (18) and (23) are both slip jointed at their respective valve arms and have collars (29) and (30) operating against springs (31) and (32) to permit further travel of the rods after the valves have been successively closed so as to provide the necessary movement for operating the air valve (8) as explained.

Having thus described my invention and illustrated one method of carrying it out in the progressive control of special valves cooperating with the throttle valve and all operated by a single foot control,

I claim:

1. In a gas engine having inhaust and exhaust pipes, and a fuel throttle valve for admitting vaporized fuel to the inhaust, an auxiliary valve in the inhaust pipe between the engine and the fuel throttle adapted for shutting off the inhaust, and a similar auxiliary valve in the exhaust pipe for closing the same, and a common control for all three valves whereby the auxiliary valves are closed after the throttle valve is in idling position.

2. In a gas engine having inhaust and exhaust pipes, and a fuel throttle valve for admitting vaporized fuel to the inhaust, an auxiliary valve in the inhaust pipe between the engine and the fuel throttle adapted for shutting off the inhaust, and a similar auxiliary valve in the exhaust pipe for closing the same, and a common control for all three valves whereby the auxiliary valves are closed after the throttle valve is in idling position, and means for admitting air to the inhaust between the auxiliary valve thereon and the engine.

3. In a gas engine having inhaust and exhaust pipes, and a fuel throttle valve for admitting vaporized fuel to the inhaust, an auxiliary valve in the inhaust pipe between the engine and the fuel throttle adapted for shutting off the inhaust, and a similar auxiliary valve in the exhaust pipe for closing the same, and a common control for all three valves whereby the auxiliary valves are closed after the throttle valve is in idling position, and an air valve on the inhaust for admitting air thereto at a point between the auxiliary valve thereon and the engine, said air valve being connected for opening by the common control after all the other valves are closed.

4. In a gas engine having inhaust and exhaust pipes, and a fuel throttle valve for admitting vaporized fuel to the inhaust, an auxiliary valve in the inhaust pipe between the engine and the fuel throttle adapted for shutting off the inhaust, and a similar auxiliary valve in the exhaust pipe for closing the same, and a common control for all three valves whereby the auxiliary valves are closed after the throttle valve is in idling position, and an air valve on the inhaust for admitting air thereto at a point between the auxiliary valve thereon and the engine, said air valve being connected for opening by the common control after all the other valves are closed, and means for holding the air valve closed when the other valves are open.

5. In an internal combustion engine having inhaust and exhaust pipes, a fuel throttle valve for admitting vaporized fuel to the inhaust and normally held closed, a valve in the exhaust pipe normally held open, a connection from each valve to a common control whereby the exhaust valve is closed after closing of the throttle valve and opened before opening of the throttle valve.

6. In an automobile internal combustion engine, common means for controlling the exhaust passage, the inhaust passage and the fuel passage.

7. In an automobile internal combustion engine, a pedal for controlling the exhaust passage, the inhaust passage and the fuel passage upon various movement of the pedal.

RICHARD G. NOBLE.